Jan. 6, 1931.  L. B. POWERS  1,787,837
COMBINED REFRIGERATOR AND ICE CREAM FREEZER
Filed July 9, 1929    2 Sheets-Sheet 1

Inventor
Lucile B. Powers,
By J. Stanley Burch
Attorney

Jan. 6, 1931.  L. B. POWERS  1,787,837

COMBINED REFRIGERATOR AND ICE CREAM FREEZER

Filed July 9, 1929  2 Sheets-Sheet 2

Inventor
Lucile B. Powers,
By J. Stanley Burch
Attorney

Patented Jan. 6, 1931

1,787,837

UNITED STATES PATENT OFFICE

LUCILE BORDEN POWERS, OF KNOXVILLE, TENNESSEE

COMBINED REFRIGERATOR AND ICE-CREAM FREEZER

Application filed July 9, 1929. Serial No. 376,969.

The present invention relates to improvements in combined refrigerators and ice cream freezers and has for its principal object to provide a structure that comprehends the association of an ice cream freezer mechanism with a power operated refrigerator.

One of the important objects of the present invention is to provide a structure of the above mentioned character wherein the ice cream freezer unit is removably positioned within one of the compartments provided in the freezing chamber for the reception of the removable ice pans or trays.

A further important object is to provide a device or structure of the above-mentioned character wherein the ice cream freezer includes a stationary horizontally disposed cylinder within which is rotatably mounted a stirrer, means being provided whereby the stirrer may be operated by an electric motor or by hand.

A further and important object of the invention is to provide a combined refrigerator and ice cream freezer which will not necessitate any material alterations of the refrigerator to accommodate the ice cream freezer, said ice cream freezer being readily and easily inserted and removed from the refrigerator.

A further object is to provide a structure of the above-mentioned character whereby considerable time and labor will be saved in making ice cream and at the same time utilizing the freezing chamber of the refrigerator to freeze the ice cream, it being only necessary to remove two of the ice pans or trays and the supporting partition to permit the positioning of the freezer unit in the chamber.

Other objects and advantages of the invention will become apparent from the following description when taken in connection with the accompanying drawings.

In the accompanying drawings wherein like reference characters indicate corresponding parts throughout the same;

Figure 1:
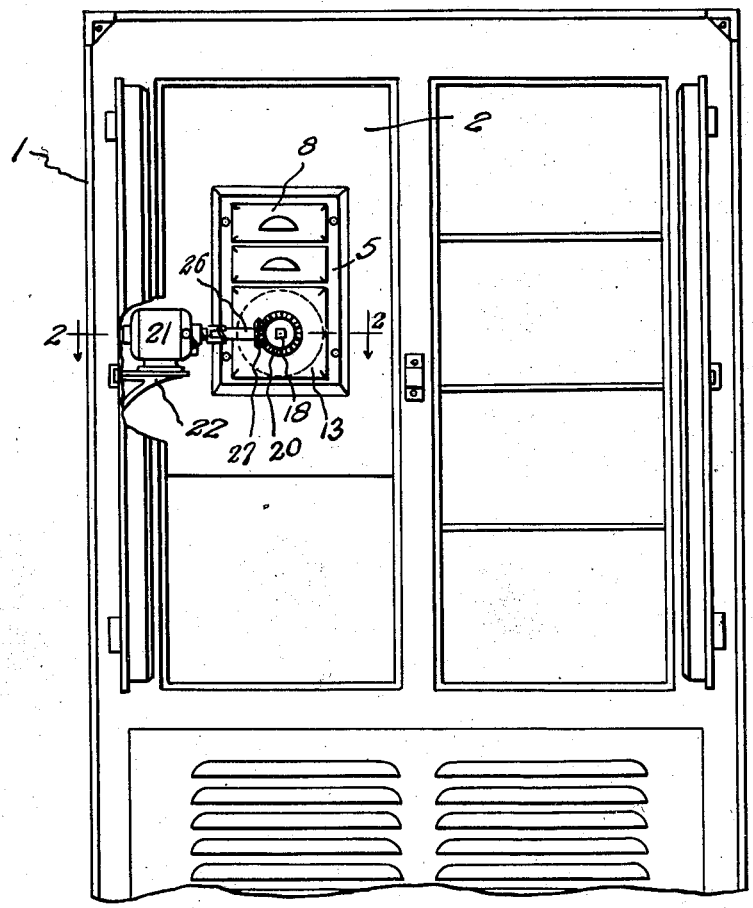
Figure 1 is a front elevation of an electric household refrigerator showing the ice cream freezer unit positioned in the freezing chamber and the motor for actuating the stirrer connected up therewith.

In the drawings wherein for the purpose of illustration is shown the preferred embodiment of my invention, the numeral 1 designates generally the cabinet of an electric refrigerator, the freezing compartment thereof being indicated at 2. The refrigerating mechanism which is of a conventional construction is not shown in the drawings as the same forms no important part of the present invention, the only part of the refrigerating mechanism that is necessary to be illustrated and described are the coils 3 through which the refrigerant circulates.

The coils 3 encircle the ice pan or tray receiving compartment 4 that is open at its front side and a cover plate 5 is disposed over the open front side of the compartment 4 and is secured to the vertical wall 6 arranged in the chamber 2 by any appropriate fastening means. Ice tray supporting shelves 7 are arranged in vertical spaced relation within the compartment 4 in the usual manner and the removable ice pans or trays that are positioned within the compartment 4 are shown at 8 in Figure 1. It is of course understood that the plate 5 is provided with openings to accommodate the removable ice pans or trays 8.

The liquid refrigerant is supplied to a boiler or header not shown through the means of a compressor and condenser operated by suitable power means such as an electric motor all of which are well known in the art and are not shown and the liquid refrigerant circulates through the coils whereby to freeze the water placed in the pans or trays 8. This same mechanism may be employed for freezing ice cream and to this end, certain of the ice pans or trays are removed and positioned in the compartment 4 vacated by the aforesaid ice pans or trays is the horizontally disposed ice cream freezer unit that includes a pair of rectangular shaped end frames denoted by the numeral 9 and these frames are connected together by the angle irons connecting strips 10.

Figure 2:
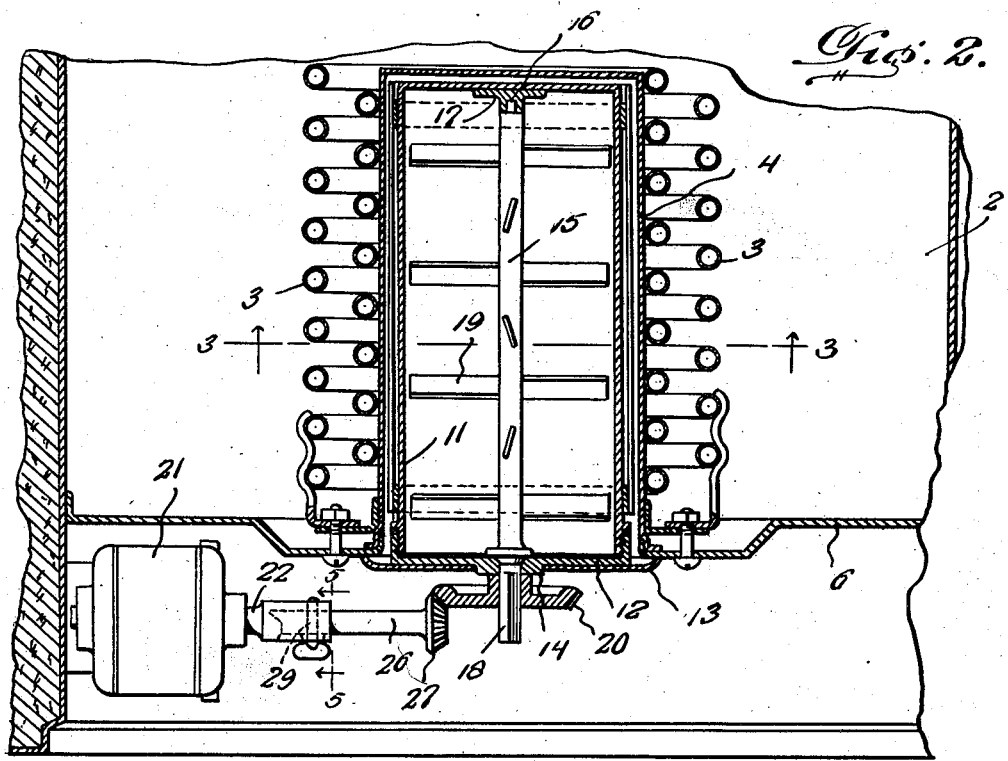
Figure 2 is a sectional view taken approximately on the line 2—2 of Figure 1 on an enlarged scale.
Figure 3:
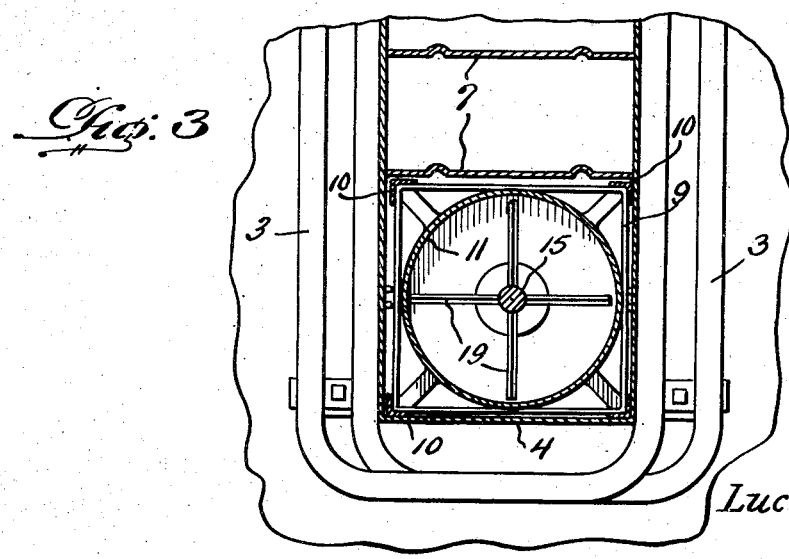
Figure 3 is a vertical section taken on line 3—3 of Figure 2, looking in the direction of the arrows.

Fixedly secured within the spaced frames 9 is the cylinder 11 that is open at its forward end, the forward end of the cylinder being externally threaded for the reception of the internally threaded cap or closure 12 as suggested very clearly in Figure 2. A removable cover plate 13 is provided for the compartment within which the ice cream freezer unit is horizontally positioned and the closure 12 is formed with a boss 14 that extends through a central opening formed in the closure plate 13 as shown very clearly in Figure 2.

Journaled for rotation within the cylinder 11 is the stirrer shaft 15. The inner or rear end thereof is formed with a reduced portion 16 that is journaled for rotation within a suitable bearing 17 arranged on the inner face of the closed end of the cylinder 11. The forward end of this shaft 15 is journaled through the boss 14 and the forward extremity of this shaft is substantially square in cross section and of a suitable length as indicated at 18 also in Figure 2.

A series of stirring elements or paddles 19 extend radially from the shaft 15 for disposition within the cylinder 11 for the purposes well known in the art.

Figure 4:
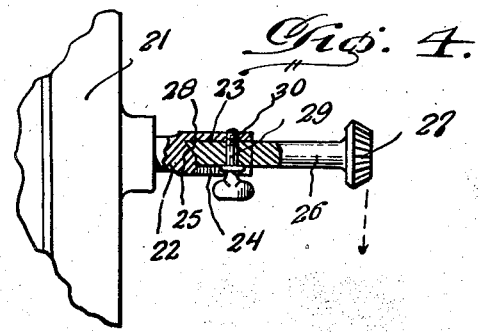
Figure 4 is a detail of the detachable connection between the driven shaft and the drive shaft of the motor.
Figure 5:
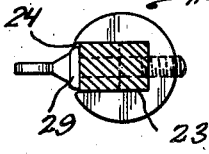
Figure 5 is a sectional view taken approximately on the line 5—5 of Figure 2, looking in the direction of the arrows.

The operating means for the rotatable stirrer includes a beveled gear 20 that is removably secured on the squared forward end 18 of the shaft 15. A small electric motor 21 of any conventional construction is supported on a suitable bracket 22 adjacent the front side of the partition or wall 6 and the drive shaft 22' of this electric motor 21 is formed with a socket 23 that is open at one side as indicated at 24 in Figures 4 and 5 of the drawings. A beveled notch 25 is formed in the closed end of the socket 23.

Removably secured within the socket 23 is the inner end of a driven shaft 26 that carries at its outer end a beveled pinion 27 for meshing engagement with the beveled gear 20. The inner end of the shaft 26 is of the same configuration as the socket 23 and is formed at its extremity with a nose portion 28 for cooperation with the beveled notch 25 as shown very clearly in Figure 4. Additional securing means for the driven shaft includes a thumb screw 29 that extends transversely through the inner end portion of the shaft 26 and the threaded end of this screw is threaded through an opening formed in the closed side of the socket 23. By removing the thumb screw 29 from the threaded opening 30, the shaft 26 may be swung in the direction of the arrow in Figure 4 to facilitate its removal from the drive shaft 22' and when the parts are connected in the manner as shown and the pinion 27 meshes with the beveled gear 20, when the motor 21 is in operation, the stirrer in the cylinder 11 will be rotated to churn the ice cream and the refrigerant that circulates through the coils 3 will freeze the ice cream in a positive and efficient manner and also in a very short time.

In lieu of the motor operating means for the stirrer unit, a hand crank not shown may be removably secured on the squared forward end 18 of the shaft 15 so that the stirrer will be operated manually.

After the ice cream has been manufactured in its frozen state, the entire freezer unit may be removed from the compartment 4 and the ice trays re-inserted therein and the water in the trays will be quickly and easily frozen by the coils 3 in the manner well known in the art.

It will thus be seen from the foregoing description, that I have provided a combined refrigerator and ice cream freezer that will save considerable expense as well as time and labor in the making of ice cream in homes where domestic refrigerators are used and furthermore the ice cream freezer is of such construction as not to necessitate any material alterations of the refrigerating apparatus when said freezer is brought into use.

While I have shown the preferred embodiment of my invention, it is to be understood that minor changes in the size, shape and arrangement of parts may be resorted to without departing from the spirit of the invention or the scope of the appended claims.

What I claim is:

1. In combination with a domestic refrigerator having a front door and an open front ice tray receiving chamber surrounded by refrigerating coils, a frame removably fitted in the lower portion of said chamber, an ice cream freezer including a horizontal cylinder mounted in and carried by said frame for preventing the freezer from contacting with the chamber walls, and a stirrer mounted in said cylinder and provided with an operating shaft having a projecting front end adapted to be engaged by an operating crank when the front door of the refrigerator is opened.

2. In combination with a domestic refrigerator having a front door and an open front ice tray receiving chamber surrounded by refrigerating coils, a frame removably fitted in the lower portion of said chamber, an ice cream freezer including a horizontal cylinder mounted in and carried by said frame for preventing the freezer from contacting with the chamber walls, and a stirrer mounted in said cylinder and provided with an operating shaft having a projecting front end, a motor mounted in the refrigerator in front of and at one side of the chamber, and a driving connection between said motor and the front end of the stirrer operating shaft.

In testimony whereof I affix my signature.

LUCILE BORDEN POWERS.